Oct. 11, 1955  E. J. KIMM ET AL  2,720,212
VENT VALVE MECHANISM
Filed Dec. 28, 1950

INVENTORS
EWALD J. KIMM &
PAUL F. EARLY

BY Edward Reed
ATTORNEY

United States Patent Office 2,720,212
Patented Oct. 11, 1955

2,720,212

VENT VALVE MECHANISM

Ewald J. Kimm and Paul F. Early, Dayton, Ohio, assignors to Standard-Thomson Corporation, Dayton, Ohio, a corporation of Delaware Application December 28, 1950, Serial No. 203,170

1 Claim. (Cl. 137—81)

This invention relates to a valve mechanism and is designed more particularly for use in controlling the vents of crank cases, oil tanks and the like on aircraft, but is not limited to such use.

One object of the invention is to provide such a valve mechanism which is controlled by a bellows or other device which is responsive to variations in temperature or in atmospheric pressure.

A further object of the invention is to provide a valve mechanism in which the movable valve member will be seated without flutter or vibration.

A further object of the invention is to provide a valve mechanism in which one part of the movable valve member engages the valve seat in advance of other parts thereof and said other parts progressively engage said valve seat.

A further object of the invention is to provide such a valve mechanism in which the movement of the movable valve member to and from its closed position is automatically controlled.

A further object of the invention is to provide such a valve mechanism which is positive in operation, simple in construction, and can be produced at a relatively low cost.

Other objects of the invention may appear as the mechanism is described in detail.

In the accompanying drawings.

Figure 1:
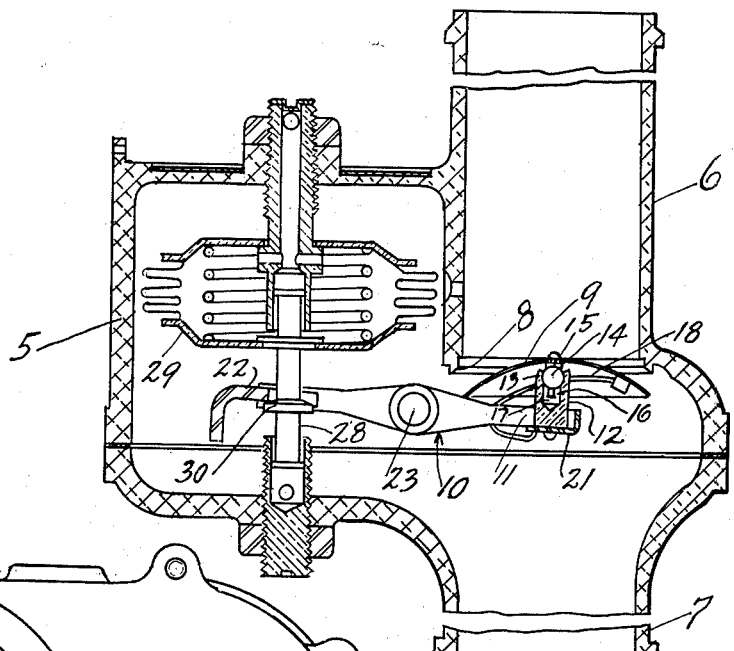
Figure 1 is a section taken centrally through a valve mechanism embodying the invention.
Figure 2:
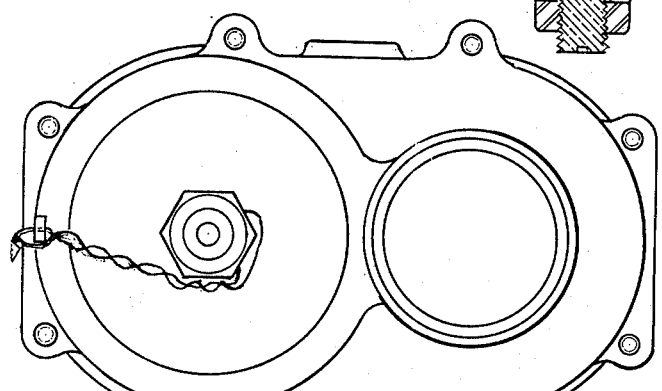
Figure 2 is a top plan view of the mechanism.
Figure 4:
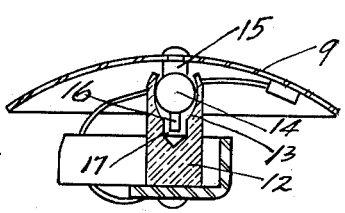
Figure 4 is a detail of the ball and socket connection between the valve member and its support.
Figure 3:
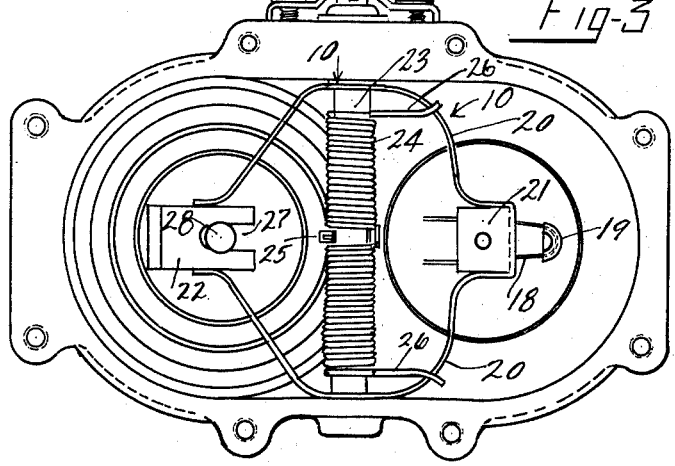
Figure 3 is a bottom plan view of the same.

In these drawings, we have illustrated one embodiment of our invention, and have shown the same as a vent controlling device for a crank case, but it is to be understood that the invention as a whole, as well as the several parts thereof, may take various forms and may be embodied in structures of various kinds.

In the form here illustrated, the mechanism comprises a casing 5 having alined tubular portions 6 and 7 which are adapted to be connected with the crank case or other device to be vented and constitute a flow passage. The tubular portion 6 is provided adjacent its inner end with a valve seat 8, with which co-operates a movable valve member 9. This valve member is supported for movement bodily into and out of engagement with the valve seat, and is so supported and controlled that when it is in its open position, spaced from the valve seat, it will be tilted about an axis transverse to the line of its movement toward and from the valve seat, so that one edge portion of the valve member will be spaced from the valve seat a distance less than the distance the opposite edge portion of said valve member is spaced from the valve seat. Consequently, when the valve member, in its tilted position, is moved toward the valve seat, the first-mentioned edge portion thereof will engage the valve seat in advance of the other edge portions. The movement of that edge portion which has first engaged the valve seat is thus interrupted and the further movement of the valve member in valve closing direction causes the other edge portions thereof to progressively engage the valve seat, thereby causing the valve member to be firmly seated and retained seated without flutter or chatter.

The movable valve member may be of any suitable construction and may be supported in any suitable manner and, in the present mechanism, it is concavo-convex in form; that is, it conforms to a section of a sphere. The supporting means for the valve member is shown as a lever 10 pivotally mounted between its ends on an axis transverse to the flow passage and preferably at one side thereof. One end portion 11 of this lever extends into line with the valve seat and is provided with means for supporting the movable valve member thereon. In the present arrangement, a bearing block 12 is rigidly secured to the part 11 of the lever, substantially in line with the axis of the valve seat, and is provided in its upper portion with a spherical socket 13 in which is mounted a bearing ball 14 which is rigidly secured to the movable valve member 9, preferably at the center thereof. In the arrangement shown, the bearing ball 14 is provided with a lug 15 to which the valve member 9 is riveted. At its opposite side, the ball is provided with a lug 16 which extends into a recess 17 below the ball and of a width greater than the thickness of the lug, so that the lug limits the movement of the valve member about the transverse axis of the ball. The tilting movement may be imparted to the valve member in any suitable manner, but preferably spring means is employed for this purpose. As shown, a U-shaped spring 18 has its transverse portion rigidly secured to the valve member adjacent one edge portion thereof, as indicated at 19. The two legs of the spring extend inwardly on opposite sides of the bearing block 12, and then downwardly and outwardly, and are rigidly secured to the end portion 11 of the lever 10 and thus tend to tilt the valve member about its transverse axis. It is to be noted that the bearing block extends into the concave side of the valve member and the axis of the connection between the block and the valve member is close to the concave surface of the valve member.

The lever 10 comprises two members or arms 20 which are rigidly connected one to the other at their respective ends by plates 21 and 22, plate 21 constituting the support for the bearing block 12. The intermediate portions of the two arms are spaced widely one from the other and are pivotally mounted on a normally stationary shaft 23 mounted in the side walls of the casing. A spring 24 is coiled above the shaft, and the central portion of the spring is rigidly secured to the shaft at 25. The end portions 26 of the spring extend forwardly beneath the arms 20 of the lever, and the spring is wound in such a direction that it tends to move the forward portions of the arms upwardly with relation to the shaft and thus move the valve member toward its seat. The movement of the lever by the spring is automatically controlled by a bellows, 29, or other device which is adapted to expand and contract with variations in temperature or pressure. In the present instance the bellows is responsive to variations in atmospheric pressure and is connected with the lever 10 by a rod 28 which extends through a slot 27 in the plate 22 which connects the rear ends of the lever arms. A collar 30 on the rod 28 is arranged beneath and has supporting connection with the plate 22 and counterbalances the forward portion of the lever mechanism. The tension of the spring 24 may be adjusted by means of rotation of the shaft 23. A slotted head 31 is provided on one end of the shaft 23 for this adjustment. The spring 24 is so wrapped about the shaft that it is in a balance. The spherical valve member being mounted on the ball and socket joint will seek its own center of force and will balance itself in the air stream. Thus the mechanism is normally in static balance. The arrangement of the mechanism as a whole is such that at sea level the lever will be retained in valve opening position and as atmospheric pressure decreases at higher altitudes the expansion of the bellows permits the movement of the lever in valve closing direction by the spring.

While we have shown and described one embodiment of our invention, we wish it to be understood that we do not desire to be limited to the details thereof, as various modifications may occur to persons skilled in the art.

Having now fully described our invention, what we claim as new and desire to secure by Letters Patent is:

In a valve mechanism, a housing having wall sections, openings through the wall sections forming a flow passage, a valve seat at the inner end of one opening, a concavo-convex valve member having its convex surface seating within said valve seat, a lever member comprising a pair of arcuate arms joined at the ends thereof having an end thereof movable toward and from said valve seat, said valve member being pivotally mounted on said end of said lever, a shaft adjustably attached to wall sections of said housing, said shaft extending through said arcuate arms and rotatably supporting said lever substantially at the longitudinal center of said lever, an expansive device supported within said housing, a rod rigidly attached to said expansive device and extending therefrom for movement through a bifurcate portion of the lever member and transverse thereto as the expansive device expands and contracts, a collar attached to said rod, and a helical spring encircling said shaft and having one end attached to said shaft and the other end engaging the portion of said lever upon which said valve member is mounted, resiliency of said spring being adjustable by means of rotatively adjusting said shaft, said spring urging rotation of said lever, a portion of said lever engaging said collar, said collar being retained against said lever by the spring.

References Cited in the file of this patent

UNITED STATES PATENTS

| | | |
|---|---|---|
| 827,823 | Starr | Aug. 7, 1906 |
| 934,188 | Kirby | Sept. 14, 1909 |
| 1,052,710 | Clark | Feb. 11, 1913 |
| 1,125,315 | Hayward | Jan. 19, 1915 |
| 1,280,063 | Miller | Sept. 24, 1918 |
| 1,822,655 | Hamilton | Sept. 8, 1931 |
| 1,858,505 | Jacobi | May 17, 1932 |
| 1,950,120 | McKee | Mar. 6, 1934 |
| 2,008,198 | Beggs | July 16, 1935 |
| 2,046,030 | Muend | June 30, 1936 |
| 2,280,390 | Ensign | Apr. 21, 1942 |
| 2,281,411 | Campbell | Apr. 28, 1942 |
| 2,330,881 | Gora | Oct. 5, 1943 |
| 2,408,836 | Warner | Oct. 8, 1946 |
| 2,479,554 | Bugg | Aug. 23, 1949 |
| 2,506,694 | Watson | May 9, 1950 |
| 2,534,821 | Ilfield | Dec. 19, 1950 |
| 2,543,376 | Pine | Feb. 27, 1951 |
| 2,592,132 | Feilden | Apr. 8, 1952 |
| 2,669,245 | Walker | Feb. 16, 1954 |

FOREIGN PATENTS

| | | |
|---|---|---|
| 11,193 | Great Britain | 1909 |
| 106,472 | Great Britain | Mar. 20, 1918 |
| 719,093 | France | Nov. 13, 1931 |